J. F. WEBB, Jr.
ELECTRICALLY OPERATED SEMAPHORE MECHANISM.
APPLICATION FILED MAY 12, 1908.

904,741.

Patented Nov. 24, 1908.

WITNESSES:

INVENTOR
Jean F. Webb, Jr.
BY
ATTORNEYS.

J. F. WEBB, Jr.
ELECTRICALLY OPERATED SEMAPHORE MECHANISM.
APPLICATION FILED MAY 12, 1908.

904,741.

Patented Nov. 24, 1908.

WITNESSES:
John T. Schrott
Charles H. Wagner

INVENTOR
Jean F. Webb, Jr.

BY
Fred G. Dieterich
ATTORNEYS

J. F. WEBB, Jr.
ELECTRICALLY OPERATED SEMAPHORE MECHANISM.
APPLICATION FILED MAY 12, 1908.

904,741.

Patented Nov. 24, 1908.
7 SHEETS—SHEET 5.

WITNESSES:

INVENTOR
Jean F. Webb, Jr.
BY
Fred G. Dieterich & Co.
ATTORNEYS.

J. F. WEBB, Jr.
ELECTRICALLY OPERATED SEMAPHORE MECHANISM.
APPLICATION FILED MAY 12, 1908.

904,741.

Patented Nov. 24, 1908.
7 SHEETS—SHEET 6.

WITNESSES:
John T. Schrott
Charles H. Wagner

INVENTOR
Jean F. Webb, Jr.
BY
Fred G. Dieterich & Co
ATTORNEYS

J. F. WEBB, Jr.
ELECTRICALLY OPERATED SEMAPHORE MECHANISM.
APPLICATION FILED MAY 12, 1908.

904,741.

Patented Nov. 24, 1908.

WITNESSES:
John T. Schrott.
Charles H. Wagner.

INVENTOR
Jean F. Webb, Jr.,
BY
Fred G. Dieterich & Co.
ATTORNEYS.

UNITED STATES PATENT OFFICE.

JEAN F. WEBB, JR., OF DENVER, COLORADO, ASSIGNOR TO THE ELECTRIC SIGNAGRAPH AND SEMAPHORE COMPANY, INCORPORATED, OF NEW YORK, N. Y.

ELECTRICALLY-OPERATED SEMAPHORE MECHANISM.

No. 904,741.    Specification of Letters Patent.    Patented Nov. 24, 1908.

Application filed May 12, 1908.    Serial No. 432,337.

*To all whom it may concern:*

Be it known that I, JEAN F. WEBB, Jr., residing at Denver, in the county of Denver and State of Colorado, have invented certain new and useful Improvements in Electrically - Operated Semaphore Mechanism, of which the following is a specification.

My invention relates to certain new and useful improvements in electrically operated semaphore mechanisms, and primarily the invention has for its object to provide a simple and effective construction of semaphore that can be readily adapted for use in connection with any railway system, electric or steam, and that can be manufactured at a minimum cost and at the same time be so constructed as to have a maximum strength of parts and a positive operation.

Generically, my improved semaphore comprises a rotatable shaft carrying the semaphore blade and light disks, a rotatable shaft electric motor to turn said semaphore shaft to lower the blade to its safety position, a means for automatically and positively disconnecting said motor drive mechanism from the semaphore shaft after it has been turned to its safety position and another means for holding the semaphore shaft in its safety and danger positions, and a means to release said holding means at times to permit the semaphore shaft to rotate and bring the semaphore in to its danger position by gravity.

With other objects in view, which will be readily apparent to those skilled in the art to which this invention appertains, my invention also includes those novel details of construction, combination and arrangement of parts, all of which will be first described in detail and then be specifically pointed out in the appended claims, reference being had to the accompanying drawings, in which:—

Fig. 13, is a detail view of a portion of the relay mechanism.

Referring now to the accompanying drawings, in which like letters and numerals of reference indicate like parts in all of the figures, 1 represents the motor which may be of any approved type, and whose shaft $1^a$ carries a worm $1^b$ to mesh with a master worm gear $2^a$ on a shaft 2, journaled in bearings $2^x$, in the housing 100. The shaft 2 carries a loose master gear $2^b$ having suitably spaced pins $2^c$ to operate the lever $20^z$ of the relay 20 to cut out the local motor circuit, hereinafter again referred to.

A mutilated gear $2^d$ loosely mounted on the shaft 2 and secured to the gear $2^b$ to turn therewith, coöperates with a gear $3^d$ on the semaphore shaft 3, the gear $3^d$ being secured to turn with the shaft 3. A pinion $2^e$, keyed to the shaft 2, meshes with a master gear $4^a$ on a stub shaft 4, and gear $4^a$, joins with a pinion $4^b$ through a sleeve $4^c$. The pinion $4^b$ meshes with the master gear $2^b$ that runs loose on the shaft 2. The semaphore shaft 3 also carries the disk $3^e$ having a notch $3^f$ to coöperate with the pawls $5^a$—$5^b$ on a stub shaft 5, the pawl $5^a$ being released by a pin $4^x$, while the pawl $5^b$ is released from the notch $3^f$ by a segment $4^y$ on the gear $4^a$, as will be later explained. The disk $3^e$ has a pin $3^c$ that operates the return signal circuit closer 30.

Figure 5:
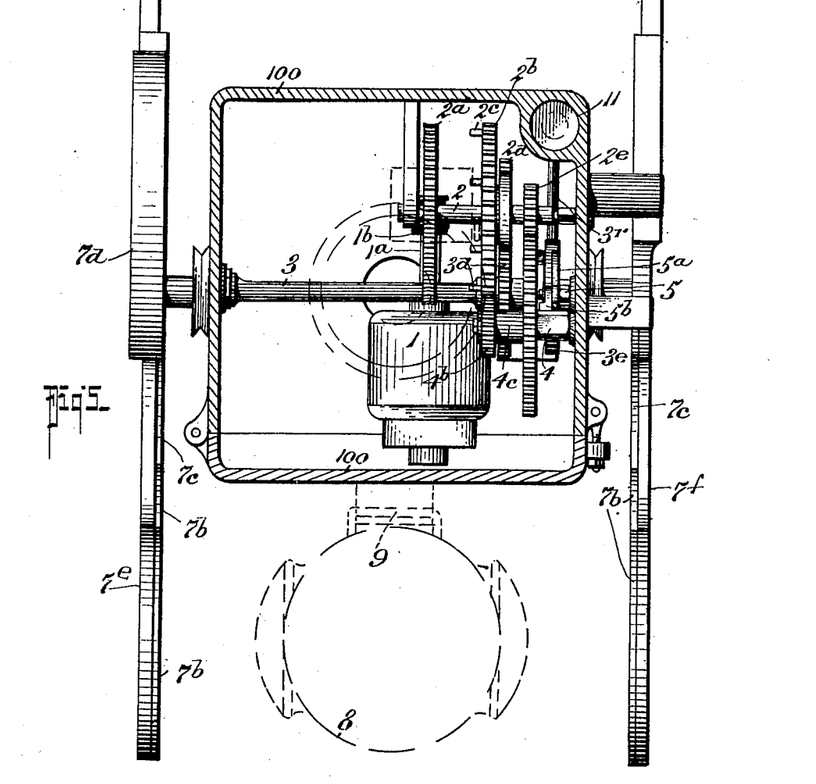
Fig. 5, is a horizontal section on the line 5—5 of Fig. 2.
Figure 6:
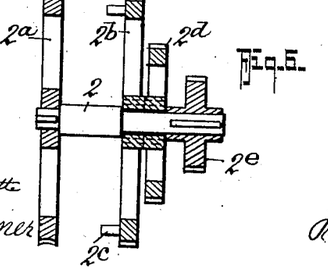
Fig. 6, is a detail view of the mutilated gear shaft carried thereby.

The semaphore has the usual blade $7^a$ and a series of light disks $7^b$—$7^b$ and $7^c$, those $7^b$ being red and that $7^c$ green to coöperate with the lamp 8 removably supported by the bracket 9, secured to the housing 100, as shown in dotted lines in Fig. 5. The lamp 8 may be of any approved type, as the same, *per se*, forms no part of my present invention.

The spectacle carrier $7^e$ is counterweighted to balance a portion of the weight of both spectacle carriers $7^e$—$7^f$ which carries the semaphore blade to its danger position when the pawl 5ª is released from engagement with the disk 3ᵉ, as will be hereinafter more fully described.

Figure 1:
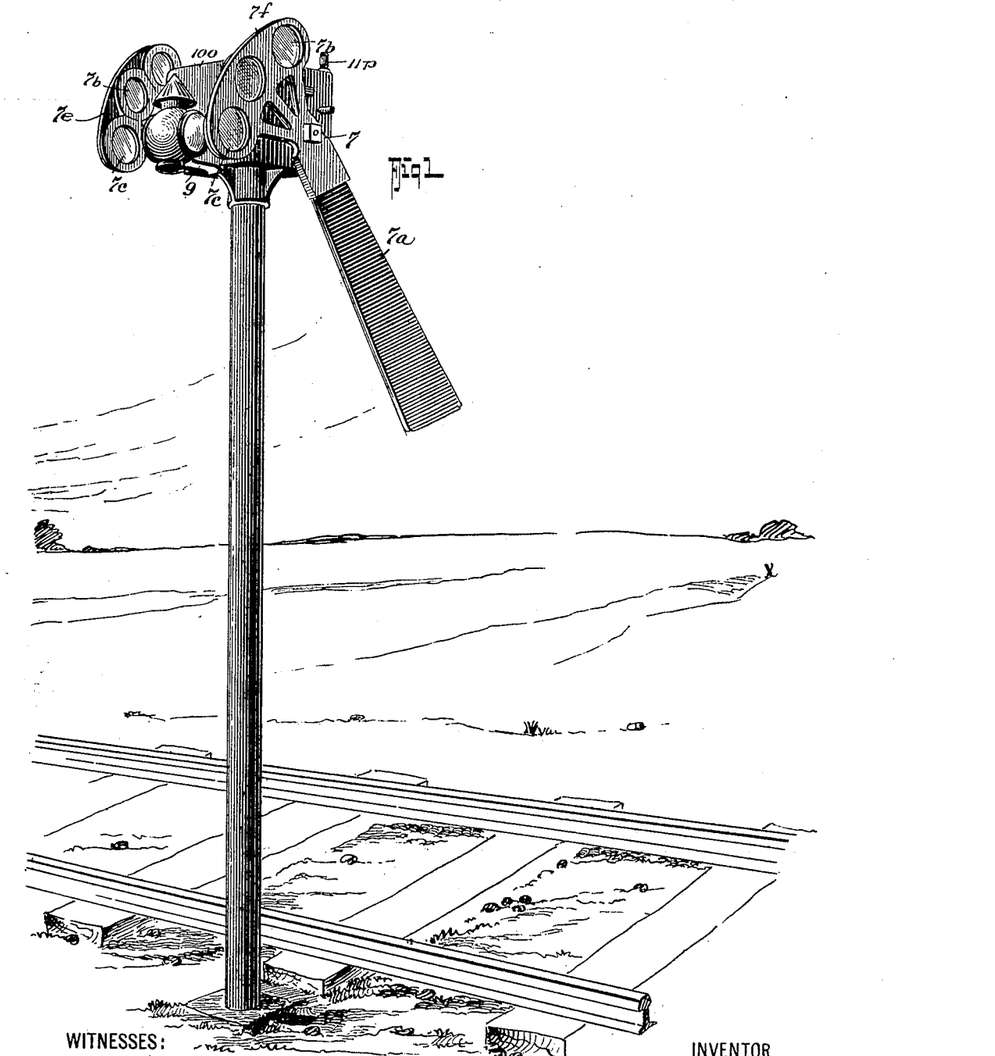
Figure 1, is a perspective view of the semaphore embodying my invention.
Figure 2:
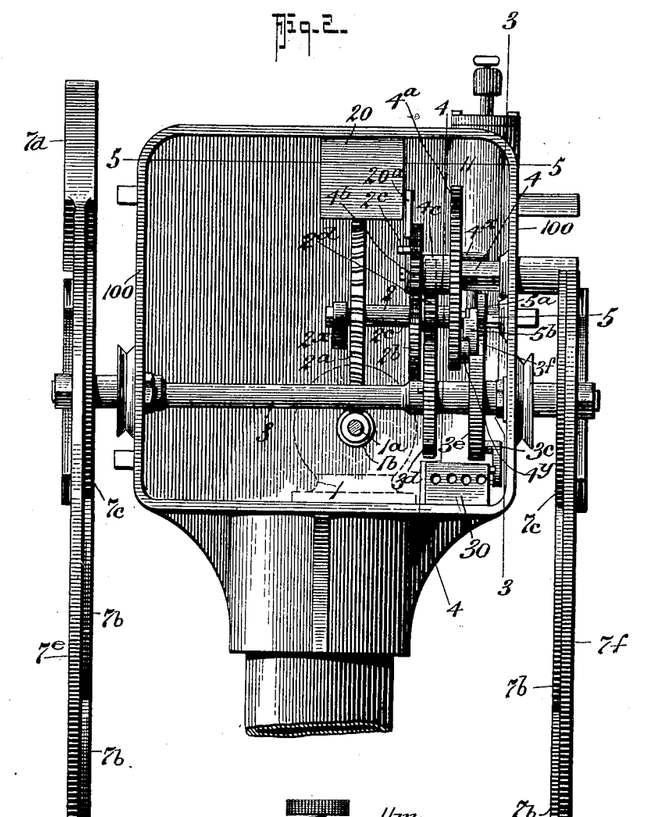
Fig. 2, is a rear elevation of a part thereof (the stand being broken away) and the back cover to the casing being removed.
Figure 3:
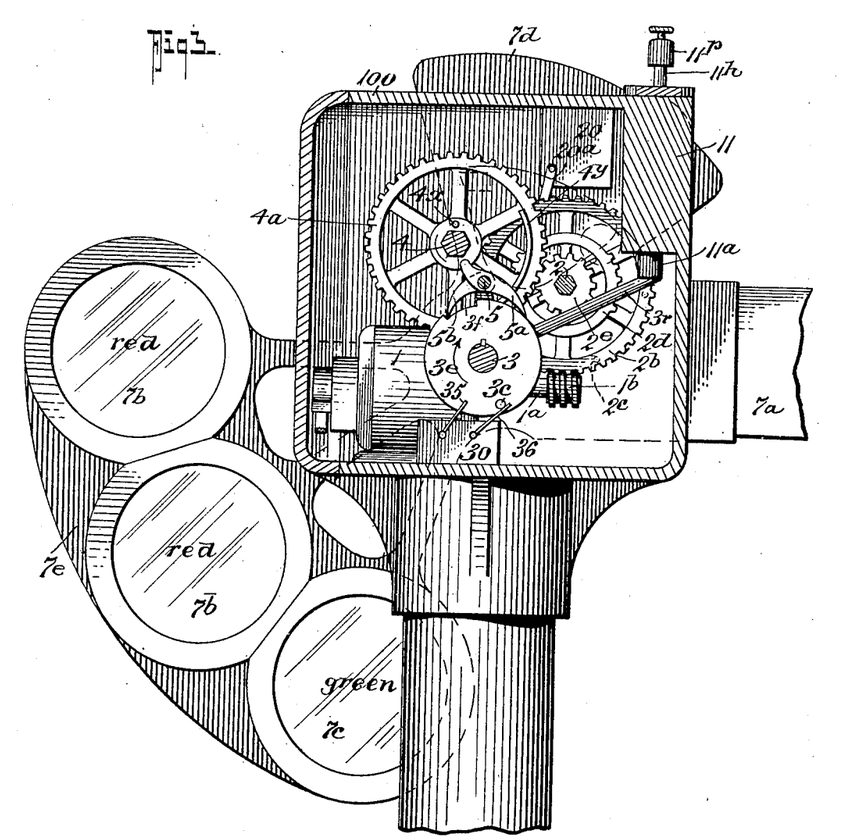
Fig. 3, is a section on the line 3—3 of Fig. 2.
Figure 8:
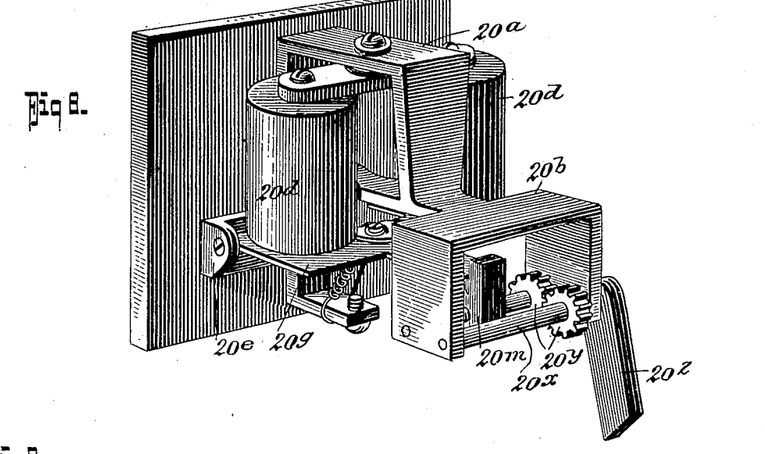
Fig. 8, is a perspective view of the semaphore operating relay removed from its casing or box.
Figures 9, 10, 11:
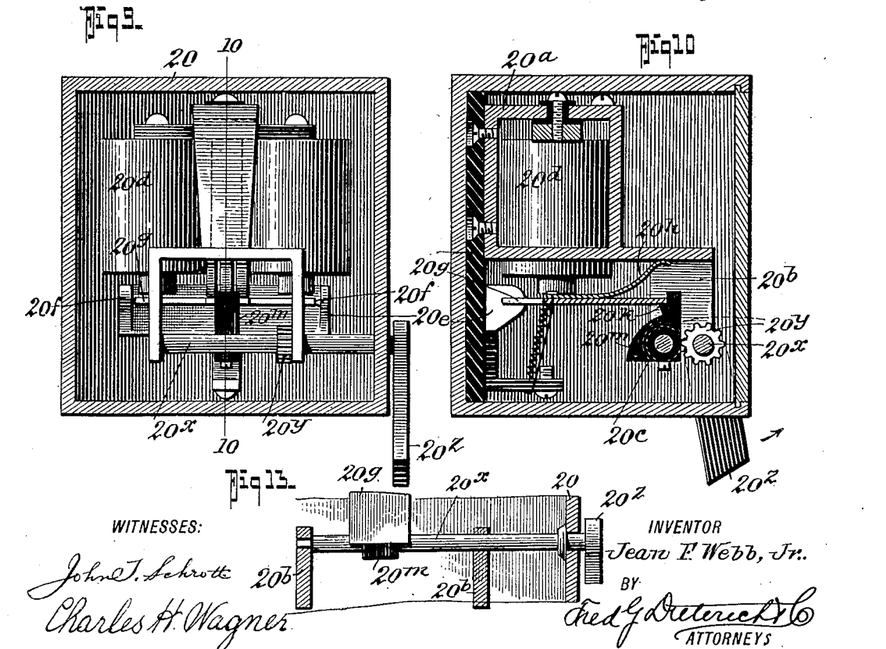
Fig. 9, is an elevation thereof in the box, the box being shown in section.
Fig. 10, is a vertical section on the line 10—10 of Fig. 9.
Fig. 11, is a plan view, the cover being removed of the semaphore controlled circuit closer.
Figure 11:
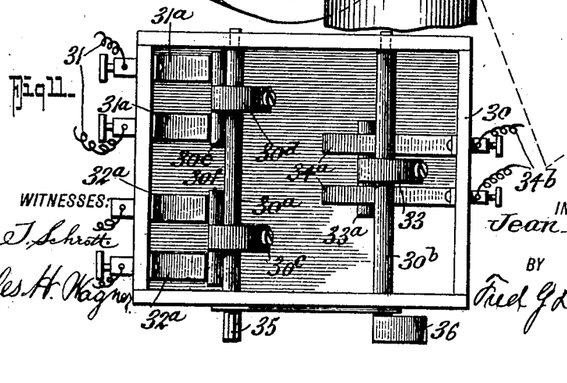

The relay 20 consists of a frame 20ª having the front U-shaped bracket 20ᵇ in which a shaft 20ᶜ is mounted. The frame 20ª supports the magnets 20ᵈ which are suitably insulated from the frame 20ª, as indicated. A bracket 20ᵉ has bearings 20ᶠ for the armature 20ᵍ that coöperates with the magnet 20ᵈ. In order to close the local motor circuit a spring 20ʰ on the armature engages the frame 20ª and the armature is held locked in its circuit closing position by a shoulder 20ᵏ on an insulating block 20ᵐ, on the gravity operated shaft 20ᶜ, (see Figs. 8, 9 and 10). The shaft 20ᶜ may be directly operated by a lever 20ᶻ, or a supplemental shaft 20ˣ may be geared to the shaft 20ᶜ by gears 20ʸ, the lever having sufficient weight to gravitate to its normal position to hold the block 20ᵐ in position. The circuit closer 30, which is best shown in Figs. 3 and 11, comprises the rotatable shafts 30ª—30ᵇ respectively, the shaft 30ª having a pair of weighted arms 30ᶜ and 30ᵈ that are provided with T contact members 30ᵉ—30ᶠ, the contact member 30ᵉ coöperating with a pair of fixed contacts 31ª—31ª, while the contact member 30ᶠ coöperates with a pair of fixed contacts 32ª—32ª, hereinafter again referred to. The weight of the members 30ᶜ—30ᵈ serves to hold the contacts 30ᵉ—30ᶠ out of engagement with their respective fixed contacts and to hold the operating lever 35 of the shaft 30ª in its normal position, shown in Fig. 3 of the drawings.

Figure 12:
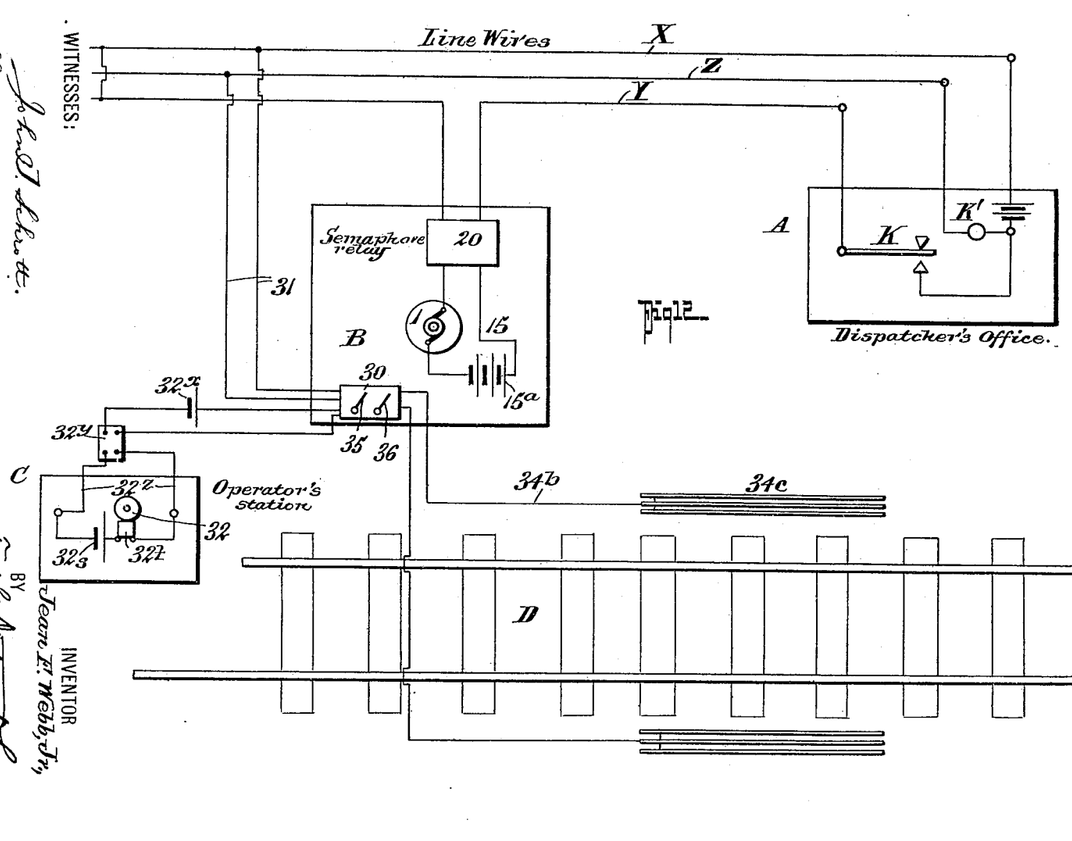
Fig. 12, is a diagram of the operating circuit and the operated circuits of my semaphore.

The shaft 30ᵇ has an operating lever 36 which is held in a position similar to the lever 35 when in its normal position, by the weight of the arm 33 which carries the T contact 33ª to make contact with a pair of fixed contacts 34ª—34ª secured to the casing of the circuit closer 30 in a manner similar to the securing of the contacts 31ª and 32ª, hereinbefore referred to. The contacts 31ª are connected to the line wires X and Z by connections 31, as indicated in Fig. 12, while the contacts 32ª are connected with the signal circuit in the local operator's station C (see Fig. 12) the local signal being indicated by the reference character 32 and includes the source of electric energy 32ˣ and the relay 32ʸ of any approved type, the relay 32ʸ serving to operate a local signal circuit 32ᶻ which includes a local source of electric energy 32ˢ and a signal 32ᵗ, as indicated in Fig. 12 of the drawings. The contacts 34ª are connected respectively through leads 34ᵇ with track contacts 34ᶜ arranged adjacent to the track D adjacent to the semaphore B (Fig. 12).

The track contacts 34ᶜ are used for closing an electric circuit carried by the train that automatically stopping the train when the train carried contacts come into engagement with the track contacts 34ᶜ, and such train stopping mechanism is not disclosed in this application since it *per se* forms no part of my present invention, but forms the subject-matter of another co-pending application.

Figure 7:
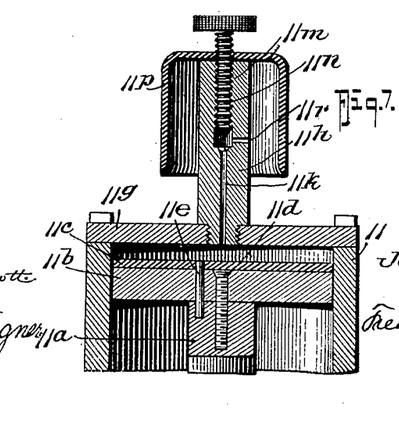
Fig. 7, is a detail section on an enlarged scale of the dash-pot construction.

In order to prevent the too sudden raising of the semaphore blade to its danger position, I provide a dash-pot 11, whose piston rod 11ª is adapted to be engaged by an arm 3ʳ carried by the disk 3ᵉ, as clearly shown in Fig. 3 of the drawings. The dash-pot 11 is constructed as best shown in Fig. 7 of the drawings, by reference to which it will be seen that the piston rod 11ª is provided with a piston 11ᵇ that carries a washer 11ᶜ, the piston 11ᵇ being secured by a screw 11ᵈ and a pin 11ᵉ to prevent the piston turning. The dash-pot is closed by the removable cap 11ᵍ into which a nipple 11ʰ is threaded, the nipple 11ʰ having a central bore 11ᵏ and a threaded portion 11ᵐ to receive an adjustable valve stem 11ⁿ that is held locked by a hood 11ᵖ which acts as a jam nut as well as a water shed. The nipple 11ʰ also has an outlet aperture 11ʳ whereby the air ahead of the piston 11ᵇ can pass through the aperture 11ᵏ and be exhausted to atmosphere, the escape of air being regulated by the valve stem 11ⁿ.

Operation: So far as described, the manner in which my invention operates will be best explained as follows: Assume the parts to be in the position shown in Fig. 3, with the signal or semaphore at its "danger" position, and assume that it is desired to return the signal to its safety position. The train despatcher, or tower operator, in his station A, (see Fig. 12) closes his key K to close the circuit through the line wires X and Y, which operates the semaphore relay 20, thus closing the local motor circuit 15, by reason of the fact that the relay magnets 20ᵈ are energized and attract their armature 20ᵍ to the position shown in Fig. 10, to close the circuit between the bracket 20ᵉ and the frame 20ª, thus closing the local circuit 15 (see Fig. 12). The local circuit includes the motor and the source of electrical energy 15ª, thus starting the motor 1 to operate. The motor transmits its motion through the worm 1ᵇ to the gear 2ª to turn the shaft 2, and cause the pinion 2ᵉ to turn the gear 4ª on the shaft 4. The movement of the gear 4ª is imparted through a sleeve 4ᶜ to the pinion 4ᵇ, which in turn turns the gear 2ᵇ that carries with it the mutilated gear 2ᵈ. When the gear 4ª begins to turn the segment 4ʸ will engage the pawl 5ᵇ (the pawl being wider than the disk 3ᵉ) and lift it out of the notch 3ᶠ so that when the gear portion of the mutilated gear 2ᵈ comes into engagement with the gear 3ᵈ on the semaphore shaft 3, the shaft 3 is turned in the direction of the arrow in Fig. 3, to lower the blade 7ᵃ to the position shown in dotted lines in Fig. 4. As the shaft 3 reaches the limit of its movement in moving the blade down, the pawl 5ᵃ will enter the notch 3ᶠ in the disk 3ᵉ and lock the shaft 3 in position. As soon as the shaft 3 is thus locked one of the pins 2ᶜ on the gear 2ᵇ will engage the lever 20ˣ of the relay 20, and move it in the direction of the arrow in Fig. 10, to release the armature 20ᵍ and break the local motor circuit 15, and thus stop the operation of the motor 1. Whenever the motor 1 is at rest, the mutilated portion of the gear 2ᵈ is in alinement with the gear 3ᵈ and the teeth of the gear 2ᵈ do not engage those of the gear 3ᵈ. Furthermore, after the motor 1 starts to run, it takes some few seconds before the mutilated portion of the mutilated gear passes alinement with the gear portion of the gear 3ᵈ and the teeth of the mutilated gear become engaged with those of the gear 3ᵈ, thus giving the motor an opportunity to gain its full speed before the load is thrown upon it.

Figure 4:
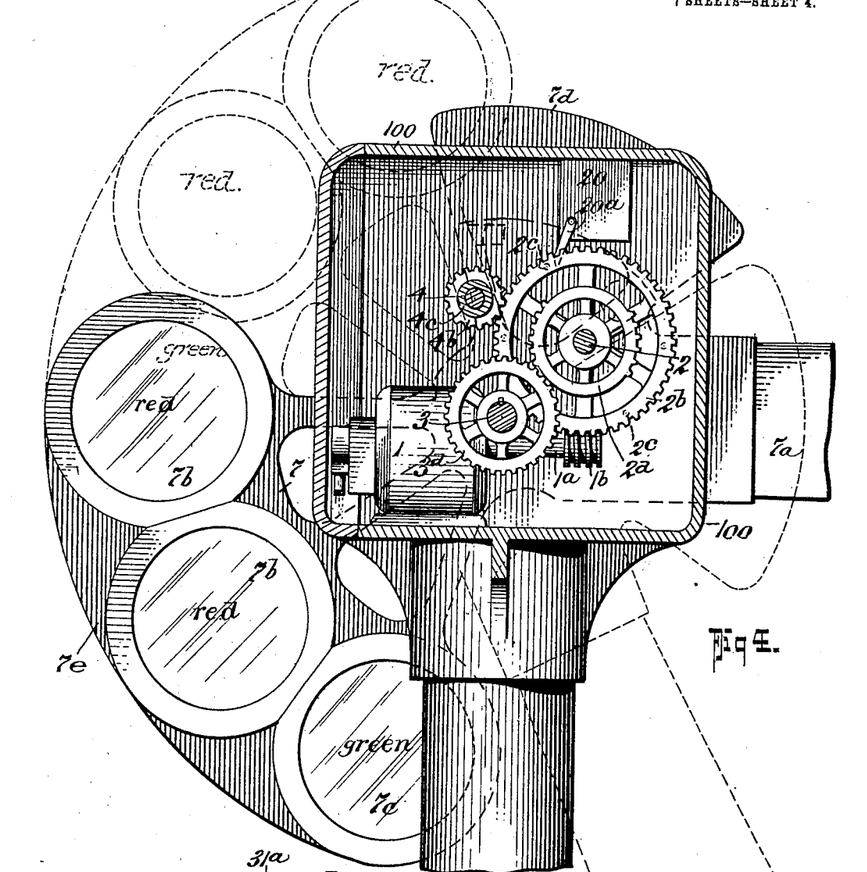
Fig. 4, is a section on the line 4—4 of Fig. 2.

After the signal is in its safety position, see dotted lines in Fig. 4, and the operator at the signal or despatcher's office A, (Fig. 12) desires to set the signal to its "danger" position, he closes his key again and again energizes the relay 20 in the semaphore to permit it to close the local circuit 15 and set the motor in operation again. As soon as the motor 1 starts the gear 4ᵃ begins to rotate until the pin 4ˣ trips the pawl 5ᵃ to release the disk 3ᵉ, and as the smooth portion of the gear 2ᵈ is in alinement with the gear 3ᵈ the weight of the spectacle carriers 7ᵉ—7ᶠ will move the semaphore to its "danger" position, one of the pins 2ᶜ on the gear 2 engages the lever 20ˣ of the relay 20 and cuts out the motor circuit before the teeth of the mutilated gear engage with the gear on the semaphore shaft. As the semaphore moves from its safety to its danger position, the pin 3ᶜ will temporarily engage the arm 35 and momentarily close the return signal circuit through wires 31 and the line wires X and Z to operate the signal K' in the despatcher's office A (see Fig. 12) to indicate to the despatcher that the semaphore has operated. The temporary engagement of the arm 35 will also cause the circuit 32ˣ to be momentarily closed to operate the relay 32ʸ and call the attention of the local agent to the fact that the semaphore has been set. As the semaphore arrives at its danger position the pin 3ᶜ will have released the arm 35 and will engage the arm 36, causing the track circuit to be closed at the contacts 34ᵃ—34ᵃ and stay closed there as long as the semaphore is in its danger position.

The circuits disclosed in Fig. 12, are merely shown to indicate a way in which the semaphore can be operated, but my semaphore is adapted to be used in connection with the train controlling system, which forms the subject-matter of another application.

From the foregoing description taken in connection with the accompanying drawings, it is thought the complete construction, operation and numerous advantages of my invention will be readily understood by those skilled in the art to which the invention appertains.

What I claim is:—

1. In a semaphore mechanism, a rotatable semaphore shaft, semaphore signals carried thereby, a motor having a rotatable drive shaft, a gear carried by the semaphore shaft, and a train of gears connecting the motor shaft with the semaphore gear, said train of gears including a mutilated gear substantially as shown and described.

2. In a semaphore mechanism, a rotatable semaphore shaft, semaphore signals carried thereby, a motor having a rotatable drive shaft, a gear carried by the semaphore shaft, gear connections between the motor shaft and the semaphore gear, said gear connections including a mutilated gear, and means independent of the gears for holding the semaphore shaft locked at times.

3. In a semaphore mechanism, a rotatable semaphore shaft, semaphore signals carried thereby, a motor having a rotatable drive shaft, a gear carried by the semaphore shaft, gear connections between the motor shaft and the semaphore gear, said gear connections including a mutilated gear, means independent of the gears for holding the semaphore shaft locked at times, and means carried by said train of gears to release said locking means at times.

4. In a semaphore mechanism, a rotatable semaphore shaft, semaphore signals carried thereby, a motor having a rotatable drive shaft, a gear carried by the semaphore shaft, gear connections between the motor shaft and the semaphore gear, said connections including a mutilated gear coöperating with the semaphore gear, means for holding said semaphore shaft locked from rotation in one direction, and a second means for holding it locked from rotation in the opposite direction, and separate means for releasing said locking means.

5. In a semaphore mechanism, a rotatable semaphore shaft, semaphore signals carried thereby, a motor having a rotatable drive shaft, a gear carried by the semaphore shaft, gear connections between the motor shaft and the semaphore gear, said connections including a mutilated gear coöperating with the semaphore gear, means for holding said semaphore shaft locked from rotation in one direction, a second means for holding it locked from rotation in the opposite direction, and means for releasing said locking means.

6. In a semaphore mechanism, a rotatable semaphore shaft, semaphore signals carried thereby, a motor having a rotatable drive shaft, a gear carried by the semaphore shaft, gear connections between the motor shaft and the semaphore gear, said connections including a mutilated gear coöperating with the semaphore gear, means for holding said semaphore shaft locked from rotation in one direction, and a second means for holding it locked from rotation in the opposite direction, and separate means for releasing said locking means, said releasing means comprising members carried by said train of gears to engage the locking means as the gears rotate.

7. A semaphore comprising a rotatable semaphore shaft carrying semaphore signals, a rotatable shaft electric motor for rotating said semaphore shaft at times, a train of gears including a mutilated gear connecting the motor shaft with the semaphore shaft, an electric circuit for said motor and including a source of electric energy, and a circuit breaker, and means controlled by the operation of the train of gears for operating said circuit breaker at times to open the motor circuit.

8. In a semaphore mechanism, a rotatable semaphore shaft, semaphore signals carried thereby, a motor having a rotatable drive shaft, a gear carried by the semaphore shaft, and gear connections between the motor shaft and the semaphore gear, said gear connections including a mutilated gear, an electric circuit for said motor and including a source of electric energy, and a circuit breaker, and means controlled by the operation of the train of gears for operating said circuit breaker to open the motor circuit.

9. In a semaphore mechanism, a rotatable semaphore shaft, semaphore signals carried thereby, a motor having a rotatable drive shaft, a gear carried by the semaphore shaft, and gear connections between the motor shaft and the semaphore gear, said gear connections including a mutilated gear coöperating with the semaphore gear, an electric circuit for said motor and including a source of electric energy and a circuit breaker, and means controlled by the operation of the train of gears for operating said circuit breaker to open the motor circuit.

10. In a semaphore mechanism, a rotatable semaphore shaft, semaphore signals carried thereby, a motor having a rotatable drive shaft, a gear carried by the semaphore shaft, gear connections between the motor shaft and the semaphore gear, said gear connections including a mutilated gear, means for holding the semaphore shaft locked at times, an electric circuit for said motor and including a source of electric energy and a circuit breaker, and means controlled by the operation of the train of gears for operating said circuit breaker at times to open the motor circuit.

11. In a semaphore mechanism, a rotatable semaphore shaft, semaphore signals carried thereby, a motor having a rotatable drive shaft, a gear carried by the semaphore shaft, gear connections between the motor shaft and the semaphore gear, said gear connections including a mutilated gear, means for holding the semaphore shaft locked at times, means carried by said train of gears to release said locking means at times, an electric circuit for said motor and including a source of electric energy and a circuit breaker, and means controlled by the operation of the train of gears for operating said circuit breaker at times to open the motor circuit.

12. In a semaphore mechanism, a rotatable semaphore shaft, semaphore signals carried thereby, a motor having a rotatable drive shaft, a gear carried by the semaphore shaft, gear connections between the motor shaft and the semaphore gear, said connections including a mutilated gear coöperating with the semaphore gear, means for holding said semaphore shaft locked from rotation in one direction, a second means for holding it locked from rotation in the opposite direction, separate means for releasing said locking means, an electric circuit for said motor and including a source of electric energy and a circuit breaker, and means controlled by the operation of the train of gears for operating said circuit breaker at times to open the motor circuit.

13. In a semaphore mechanism, a rotatable semaphore shaft, semaphore signals carried thereby, a motor having a rotatable drive shaft, a gear carried by the semaphore shaft, gear connections between the motor shaft and the semaphore gear, said connections including a mutilated gear coöperating with the semaphore gear, means for holding said semaphore shaft locked from rotation in one direction, a second means for holding it locked from rotation in the opposite direction, means for releasing said locking means, an electric circuit for said motor and including a source of electric energy, and a circuit breaker, and means controlled by the operation of the train of gears for operating said circuit breaker at times to open the motor circuit.

14. In a semaphore mechanism, a rotatable semaphore shaft, semaphore signals carried thereby, a motor having a rotatable drive shaft, a gear carried by the semaphore shaft, gear connections between the motor shaft and the semaphore gear, said connections including a mutilated gear coöperating with the semaphore gear, means for holding said semaphore shaft locked from rotation in one direction, a second means for holding it locked from rotation in the opposite direction, separate means for releasing said locking means, said releasing means comprising members carried by said train of gears to engage the locking means as the gears rotate, an electric circuit for said motor including a source of electric energy and a circuit breaker, and means controlled by the operation of the train of gears for operating said circuit breaker at times to open the motor circuit.

15. A semaphore comprising a rotatable semaphore shaft, carrying semaphore signals, a rotatable shaft electric motor for rotating said semaphore shaft at times, a train of gears connecting the motor shaft with the semaphore shaft, said train of gears including a mutilated gear an electric circuit for said motor and including a source of electric energy, and a circuit breaker, and means controlled by the operation of the train of gears for operating said circuit breaker at times to open the motor circuit, and means for closing the motor circuit at times to operate the train of gears.

16. A semaphore comprising a rotatable semaphore shaft carrying semaphore signals, a rotatable shaft electric motor for rotating said semaphore shaft at times, a train of gears connecting the motor shaft with the semaphore shaft, said train of gears including a mutilated gear an electric circuit for said motor including a circuit maker and breaker, electrically controlled means for operating the circuit maker and breaker to close the motor circuit.

17. A semaphore comprising a rotatable semaphore shaft carrying semaphore signals, a rotatable shaft electric motor for rotating said semaphore shaft at times, a train of gears connecting the motor shaft with the semaphore shaft, said train of gears including a mutilated gear an electric circuit for said motor including a circuit maker and breaker, electrically controlled means for operating the circuit maker and breaker to close the motor circuit, and mechanically operated means for operating the circuit maker and breaker to break the motor circuit at times.

18. A semaphore comprising a rotatable semaphore shaft carrying semaphore signals, a rotatable shaft electric motor for rotating said semaphore shaft at times, a train of gears including a mutilated gear connecting the motor shaft with the semaphore shaft, an electric circuit for said motor including a circuit maker and breaker, electrically controlled means for operating the circuit maker and breaker to close the motor circuit, a return signal circuit including a circuit closer, a source of electric energy, and a signal, and means controlled by the rotation of the semaphore shaft for operating said circuit closer.

19. A semaphore comprising a rotatable semaphore shaft carrying semaphore signals, a rotatable shaft electric motor, a train of gears including a mutilated gear connecting the motor with the semaphore shaft, a locking disk carried by the semaphore shaft, locking pawls coöperating with said locking disk, and means carried by one of said train of gears for releasing said locking pawls at times, an electric circuit for said motor including a circuit maker and breaker, electrically controlled means for operating the circuit maker and breaker to close the motor circuit, means carried by one of the train of gears for operating the circuit maker and breaker to break the motor circuit at times, a return signal circuit including a circuit closer, a source of electric energy and a signal, and means carried by said locking disk for operating said return signal circuit closer.

20. In a semaphore mechanism, a rotatable semaphore shaft, semaphore signals carried thereby, a motor having a rotatable drive shaft, a gear carried by the semaphore shaft, gear connections between the motor shaft and the semaphore gear, said gear connections including a mutilated gear, means for holding the semaphore shaft locked at times, a local motor circuit for said motor including a relay and a local source of electric energy, an electric operating circuit also including said relay and a circuit closing member under the control of the tower operator for closing the operating circuit to work the relay to close the motor circuit, and means carried by the gear connections between the motor shaft and the semaphore gear for operating said relay to break the motor circuit.

21. In a semaphore mechanism, a rotatable semaphore shaft, semaphore signals carried thereby, a motor having a rotatable drive shaft, a gear carried by the semaphore shaft, gear connections between the motor shaft and the semaphore gear, said gear connections including a mutilated gear, means for holding the semaphore shaft locked at times, a local motor circuit for said motor including a relay and a local source of electric energy, an electric operating circuit also including said relay and a circuit closing member under the control of the tower operator for closing the operating circuit to work the relay to close the motor circuit, means carried by the gear connections between the motor shaft and the semaphore gear for operating said relay to break the motor circuit, and another circuit closer coöperating with the semaphore shaft, and means carried by the semaphore shaft for working said other circuit closer, and an electric circuit including said other circuit closer.

22. A semaphore comprising a rotatable shaft, semaphore signals directly mounted thereon, a rotatable shaft electric motor, a train of gears connecting said motor with said semaphore shaft to rotate it in one direction, mechanical means for locking the semaphore shaft from rotating in either direction, means for operatively disconnecting the semaphore shaft from the motor at times, means carried by said train of gears actuated by the motor for releasing the locking means to permit the semaphore shaft to turn, and gravity operated devices for turning said semaphore shaft in one direction when released to bring the signals to their danger position.

23. A semaphore comprising a rotatable semaphore shaft carrying semaphore signals, a rotatable shaft electric motor geared with said semaphore shaft to rotate it in one direction, mechanical means for locking said semaphore shaft from rotation in either direction, means for operatively disconnecting the semaphore shaft from the motor at times, a motor controlled means for releasing the locking means to permit the semaphore shaft to turn, gravity operated devices for turning said semaphore shaft when released to bring the signals to their danger position, and a dash-pot connected with the semaphore shaft for checking the movement of the shaft to bring the signals into the danger position.

24. In a semaphore mechanism, a rotatable semaphore shaft, semaphore signals carried thereby, a motor having a rotatable drive shaft, a gear carried by the semaphore shaft, gear connections between the motor shaft and the semaphore gear, said gear connections including a mutilated gear, means independent of the gears for holding the semaphore shaft locked at times, means carried by said train of gears to release said locking means at times, said signals being weighted to rotate the semaphore shaft in one direction when the locking means is released.

25. In a semaphore mechanism, a rotatable semaphore shaft, semaphore signals carried thereby and weighted to turn the shaft normally in one direction, means for limiting the movement of said shaft, in one direction, a motor having a rotatable drive shaft, gear connections between the semaphore shaft and the drive shaft to turn the semaphore in another direction by the action of the motor, means for operatively disconnecting the motor shaft from the semaphore shaft at times to permit the semaphore shaft being rotated under its gravitational movement, means for holding said semaphore shaft locked from rotation in one direction and another means for holding it locked from rotation in the opposite direction, motor operated means for releasing each of said locking means at times, an electric circuit for said motor including a source of electric energy and a circuit breaker, and means controlled by the operation of the gears for operating the circuit breaker at times to open the motor circuit, a means disposed at a distance from the semaphore for controlling the closing of the motor circuit, a return signal circuit including a circuit closer at the semaphore and operable by the rotation of the semaphore shaft to indicate the position of the semaphore signals.

JEAN F. WEBB, Jr.

Witnesses:
JAMES J. RAGAN,
GEO. C. SCHMITTBERGER.